(12) United States Patent
Goto et al.

(10) Patent No.: US 9,350,903 B2
(45) Date of Patent: May 24, 2016

(54) IMAGE PROCESSING APPARATUS AND IMAGE PROCESSING METHOD WHICH ADJUSTS IMAGE INSPECTION TO MATCH VARIATIONS IN THE EJECTION STATE OF THE PRINTING ELEMENT

(71) Applicant: CANON KABUSHIKI KAISHA, Tokyo (JP)

(72) Inventors: Fumitaka Goto, Tokyo (JP); Hidetsugu Kagawa, Kawasaki (JP); Senichi Saito, Funabashi (JP); Nobutaka Miyake, Yokohama (JP); Shinjiro Hori, Yokohama (JP); Akitoshi Yamada, Yokohama (JP); Ryosuke Iguchi, Kawasaki (JP); Tomokazu Ishikawa, Yokohama (JP); Kouta Murasawa, Yokohama (JP); Hiromitsu Akiba, Yokohama (JP); Junichi Nakagawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/332,232

(22) Filed: Jul. 15, 2014

(65) Prior Publication Data
US 2015/0022580 A1    Jan. 22, 2015

(30) Foreign Application Priority Data
Jul. 19, 2013  (JP) .................................. 2013-150368

(51) Int. Cl.
*B41J 29/393* (2006.01)
*H04N 1/60* (2006.01)
*B41J 2/195* (2006.01)
*B41J 2/21* (2006.01)

(52) U.S. Cl.
CPC ............... *H04N 1/6047* (2013.01); *B41J 2/195* (2013.01); *B41J 2/2142* (2013.01); *B41J 2/2146* (2013.01); *H04N 1/6036* (2013.01)

(58) Field of Classification Search
USPC .............. 347/6, 14, 15, 17, 19, 37, 40, 41, 43
See application file for complete search history.

(56) References Cited

U.S. PATENT DOCUMENTS

| | | | | |
|---|---|---|---|---|
| 2002/0122209 A1* | 9/2002 | Yoshida | ........................... | 358/2.1 |
| 2002/0171709 A1* | 11/2002 | Teshigawara et al. | ........... | 347/43 |
| 2006/0061624 A1* | 3/2006 | Nagashima | ..................... | 347/54 |
| 2009/0058914 A1* | 3/2009 | Kim et al. | ....................... | 347/17 |
| 2012/0162311 A1* | 6/2012 | Taira | ............................... | 347/30 |
| 2012/0281243 A1* | 11/2012 | Yanai et al. | .................... | 358/1.8 |
| 2013/0050317 A1* | 2/2013 | Koyama | ........................... | 347/10 |

FOREIGN PATENT DOCUMENTS

JP        2009-137150 A      6/2009

* cited by examiner

*Primary Examiner* — Hai C Pham
(74) *Attorney, Agent, or Firm* — Canon USA, Inc. I.P. Division

(57) ABSTRACT

Because the ejection state of a printing element in a printing apparatus may vary at all times, an inspection item for inspecting a printed image may be set in consideration of the ejection state of the printing element. An inspection item for inspecting a printed image may be set based on information including a temperature characteristic of a printing head and a state of ink such as an elapsed time from the last ejection. This allows image inspection that matches with variations in the ejection state of the printing element.

20 Claims, 18 Drawing Sheets

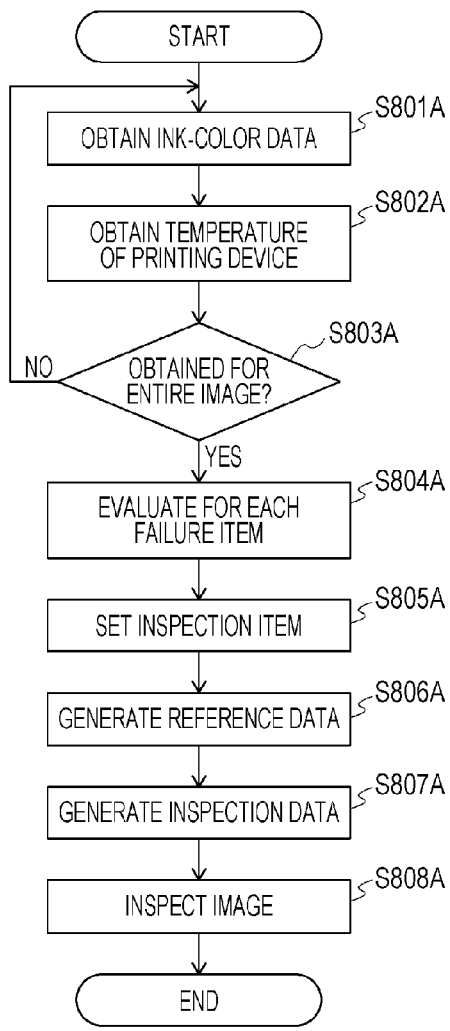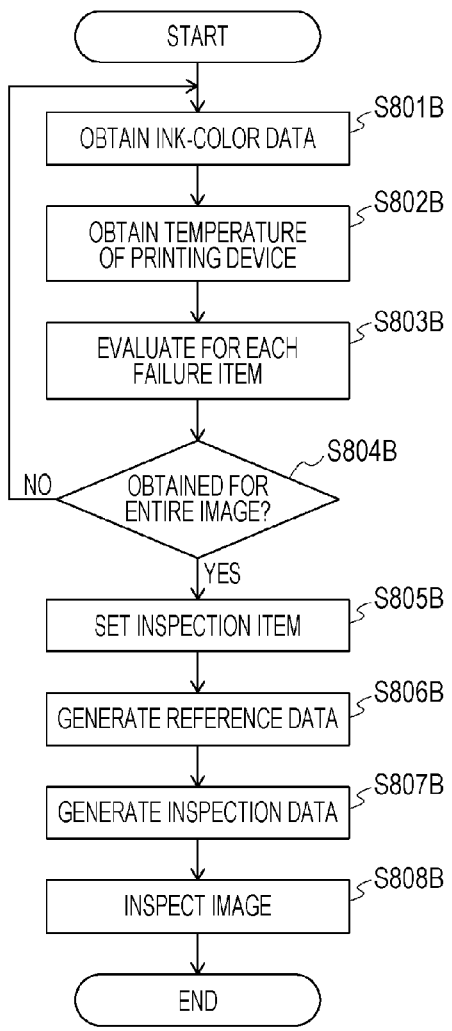

X-DIRECTION

Y-DIRECTION

CYAN

YELLOW

FIG. 11A

DENSITY DIFFERENCE UNEVENNESS DUE TO CHANGE OF INK DROPLET AMOUNT

|  |  | TEMPERATURE CHARACTERISTIC | | |
|---|---|---|---|---|
|  |  | (1) | (2) | (3) |
| USED INK | K | 3 | 5 | 2 |
|  | C | 2 | 4 | 2 |
|  | M | 2 | 3 | 1 |
|  | Y | 1 | 1 | 1 |
|  | PLURAL | 3 | 5 | 2 |

FIG. 11B

FADE DUE TO DIFFICULTY OF EJECTION OF INK DROPLET

|  |  | TEMPERATURE CHARACTERISTIC | | |
|---|---|---|---|---|
|  |  | (1) | (2) | (3) |
| USED INK | K | 1 | 1 | 3 |
|  | C | 1 | 1 | 3 |
|  | M | 1 | 1 | 1 |
|  | Y | 1 | 1 | 1 |
|  | PLURAL | 1 | 1 | 3 |

FIG. 11C

DENSITY DIFFERENCE UNEVENNESS DUE TO CHANGE OF INK DENSITY

|  |  | TEMPERATURE CHARACTERISTIC | | |
|---|---|---|---|---|
|  |  | (1) | (2) | (3) |
| USED INK | K | 1 | 2 | 5 |
|  | C | 1 | 1 | 5 |
|  | M | 1 | 1 | 4 |
|  | Y | 1 | 1 | 1 |
|  | PLURAL | 1 | 2 | 5 |

FIG. 11D

DENSITY DIFFERENCE STREAK DUE TO LANDING POSITION DEVIATION OF INK DROPLET

|  |  | TEMPERATURE CHARACTERISTIC | | |
|---|---|---|---|---|
|  |  | (1) | (2) | (3) |
| USED INK | K | 1 | 1 | 3 |
|  | C | 1 | 1 | 3 |
|  | M | 1 | 1 | 1 |
|  | Y | 1 | 1 | 1 |
|  | PLURAL | 1 | 1 | 3 |

FIG. 13

| (A) EVALUATION POINTS | DENSITY DIFFERENCE UNEVENNESS DUE TO CHANGE OF INK DROPLET AMOUNT | FADE DUE TO DIFFICULTY OF EJECTION OF INK DROPLET | DENSITY DIFFERENCE UNEVENNESS DUE TO CHANGE OF INK DENSITY | DENSITY DIFFERENCE STREAK DUE TO LANDING POSITION DEVIATION OF INK DROPLET |
|---|---|---|---|---|
| | 2 4 4 4 4 4 / 2 4 4 4 4 4 / 5 5 5 5 5 5 | 3 1 1 1 1 1 / 3 1 1 1 1 1 / 1 1 1 1 1 1 | 5 1 1 1 1 1 / 5 1 1 1 1 1 / 2 2 2 2 2 2 | 3 1 1 1 1 1 / 3 1 1 1 1 1 / 1 1 1 1 1 1 |
| (B) TOTAL EVALUATION POINTS | 70 | 6 | 10 | 6 |
| (C) SIZE OF INSPECTION REGION AGAINST ENTIRE IMAGE | 2/3 | 1/12 | 1/12 | 1/12 |

X-DIRECTION →
Y-DIRECTION ↓

FIG. 14A

|  | IMAGE PRINTING FAILURE ITEMS | | | |
|---|---|---|---|---|
|  | DENSITY DIFFERENCE UNEVENNESS DUE TO CHANGE OF INK DROPLET AMOUNT | FADE DUE TO DIFFICULTY OF EJECTION OF INK DROPLET | DENSITY DIFFERENCE UNEVENNESS DUE TO CHANGE OF INK DENSITY | DENSITY DIFFERENCE STREAK DUE TO LANDING POSITION DEVIATION OF INK DROPLET |
| EVALUATION POINTS TO BE TOTALED | 5 TO 3 | 5 TO 3 | 5 TO 3 | 5 TO 3 |
| THRESHOLD VALUES OF TOTAL EVALUATION POINTS | 30 | 5 | 5 | 5 |
| PREFERENCE | 1 | 2 | 4 | 3 |
| INSPECTION TIME FOR ENTIRE IMAGE | T | 3T | 2T | 3T |

FIG. 14B

|  | IMAGE PRINTING FAILURE ITEMS | | | |
|---|---|---|---|---|
|  | DENSITY DIFFERENCE UNEVENNESS DUE TO CHANGE OF INK DROPLET AMOUNT | FADE DUE TO DIFFICULTY OF EJECTION OF INK DROPLET | DENSITY DIFFERENCE UNEVENNESS DUE TO CHANGE OF INK DENSITY | DENSITY DIFFERENCE STREAK DUE TO LANDING POSITION DEVIATION OF INK DROPLET |
| EVALUATION POINTS TO BE INSPECTED | 5 TO 3 | 5 TO 3 | 5 TO 3 | 5 TO 3 |
| PREFERENCE | 1 | 2 | 4 | 3 |
| INSPECTION TIME FOR ENTIRE IMAGE | T | 3T | 2T | 3T |

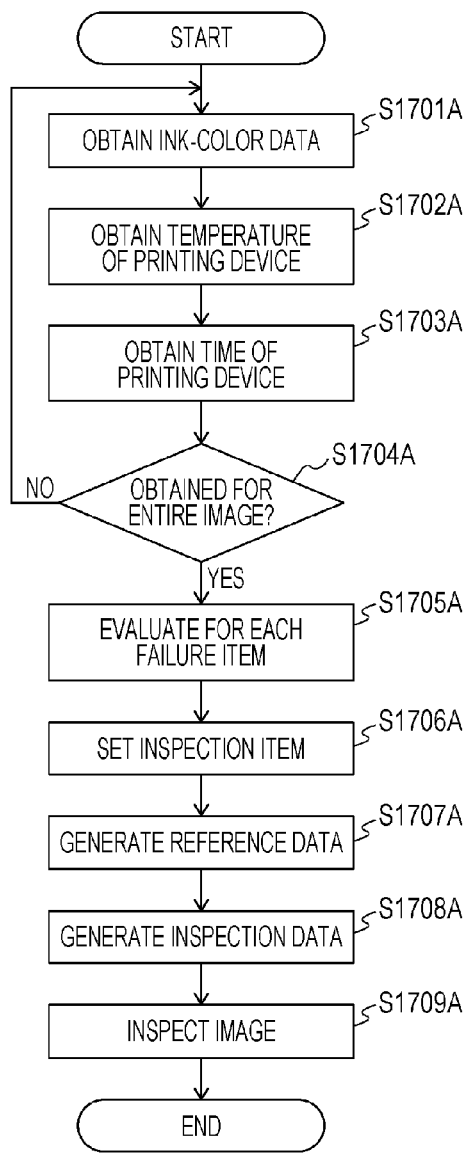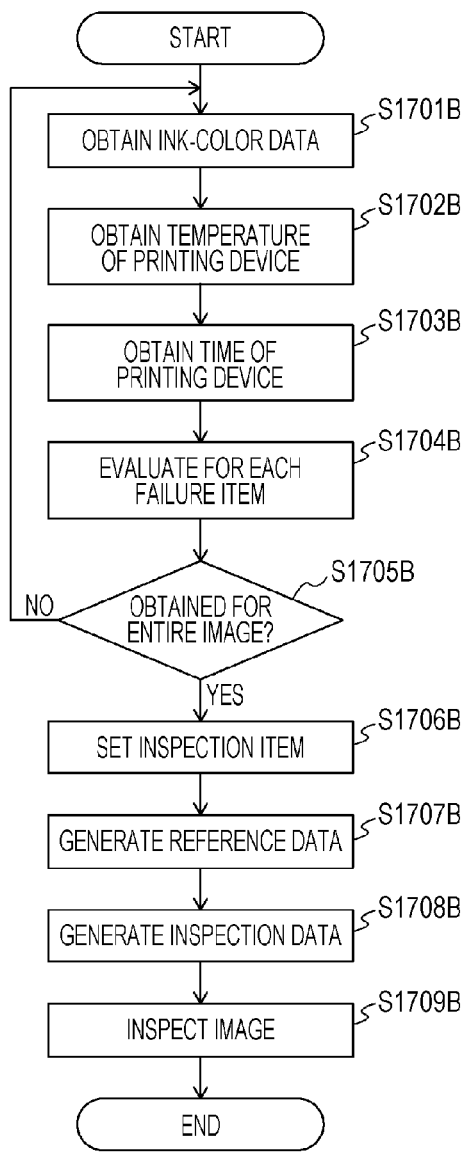

FIG. 18A

FADE DUE TO DIFFICULTY OF EJECTION OF INK DROPLET

|  |  | EJECTION TIME DIFFERENCE | | |
|---|---|---|---|---|
|  |  | SHORT | MEDIUM | LONG |
| USED INK | K | 1 | 3 | 5 |
|  | C | 1 | 2 | 4 |
|  | M | 1 | 2 | 3 |
|  | Y | 1 | 1 | 1 |
|  | PLURAL | 1 | 3 | 5 |

FIG. 18B

DENSITY DIFFERENCE UNEVENNESS DUE TO CHANGE OF INK DENSITY

|  |  | EJECTION TIME DIFFERENCE | | |
|---|---|---|---|---|
|  |  | SHORT | MEDIUM | LONG |
| USED INK | K | 2 | 4 | 5 |
|  | C | 1 | 3 | 5 |
|  | M | 1 | 3 | 4 |
|  | Y | 1 | 1 | 1 |
|  | PLURAL | 2 | 4 | 5 |

FIG. 18C

DENSITY DIFFERENCE STREAK DUE TO LANDING POSITION DEVIATION OF INK DROPLET

|  |  | EJECTION TIME DIFFERENCE | | |
|---|---|---|---|---|
|  |  | SHORT | MEDIUM | LONG |
| USED INK | K | 1 | 2 | 4 |
|  | C | 1 | 2 | 3 |
|  | M | 1 | 1 | 2 |
|  | Y | 1 | 1 | 1 |
|  | PLURAL | 1 | 2 | 4 | ns
IMAGE PROCESSING APPARATUS AND IMAGE PROCESSING METHOD WHICH ADJUSTS IMAGE INSPECTION TO MATCH VARIATIONS IN THE EJECTION STATE OF THE PRINTING ELEMENT

BACKGROUND OF THE INVENTION

1. Field of the Invention

The present invention relates to an image processing apparatus and image processing method for inspecting a printing failure occurring in an image formed on a printing medium.

2. Description of the Related Art

An apparatus configured to inspect a printing failure occurring in an image printed on a printing medium has been known conventionally. In some cases, the existence of a plurality of printing failure inspection items may enormously increase the processing time for executing all inspection items on a printed image.

Japanese Patent Laid-Open No. 2009-137150 discloses a method for setting an inspection process to be executed with high priority depending on a characteristic in input information. More specifically, whether an input command corresponds to a text rendering command, a graphic rendering command or an image rendering command is determined. For example, in a case where the command is determined as a text rendering command, inspection items may be set in accordance with characteristics such as a designated font, a font size, a line width, and a black monochromatic object. According to Japanese Patent Laid-Open No. 2009-137150, an inspection process to be carried out may be set based on data before color separation to coloring material data corresponding to a coloring material in an image printing apparatus.

SUMMARY OF THE INVENTION

The present inventors have found that variations of printing characteristics of an image printing apparatus may result in different printing failures even when identical information is input. Because the state of ink ejected from a printing element to be used for image printing may vary at all times, the variations may result in a printing failure. The method for setting an inspection item based on a characteristic in input information, which is disclosed in Japanese Patent Laid-Open No. 2009-137150, may not implement proper inspection against a printing failure caused by variations of printing characteristics of an image printing apparatus.

The present invention provides an image processing apparatus including a printing unit configured to print an image in a region on a printing medium based on input image data by using a printing head having an array of nozzles for ejecting ink, an obtaining unit configured to obtain information regarding a state of ink ejected from the printing head to the region, a determination unit configured to determine an inspection item for inspection on the image from a plurality of inspection items based on the information obtained by the obtaining unit, and an inspection unit configured to inspect the image with respect to the inspection item determined by the determination unit.

Further features of the present invention will become apparent from the following description of exemplary embodiments with reference to the attached drawings.

BRIEF DESCRIPTION OF THE DRAWINGS

FIGS. 8A and 8B illustrates details of a flow according to the first embodiment.

FIGS. 11A to 11D illustrate evaluation point tables with heads to be used and their temperature characteristics with respect to occurrence of failures.

FIG. 13 illustrates failure evaluation points according to the first embodiment.

FIGS. 14A and 14B illustrate settings for inspection items according to the first embodiment.

FIGS. 17A and 17B illustrate flows according to a second embodiment.

FIGS. 18A to 18C illustrate evaluation point tables with heads to be used and their temperature characteristics with respect to occurrence of failures.

DESCRIPTION OF THE EMBODIMENTS

First Embodiment

Figure 1:
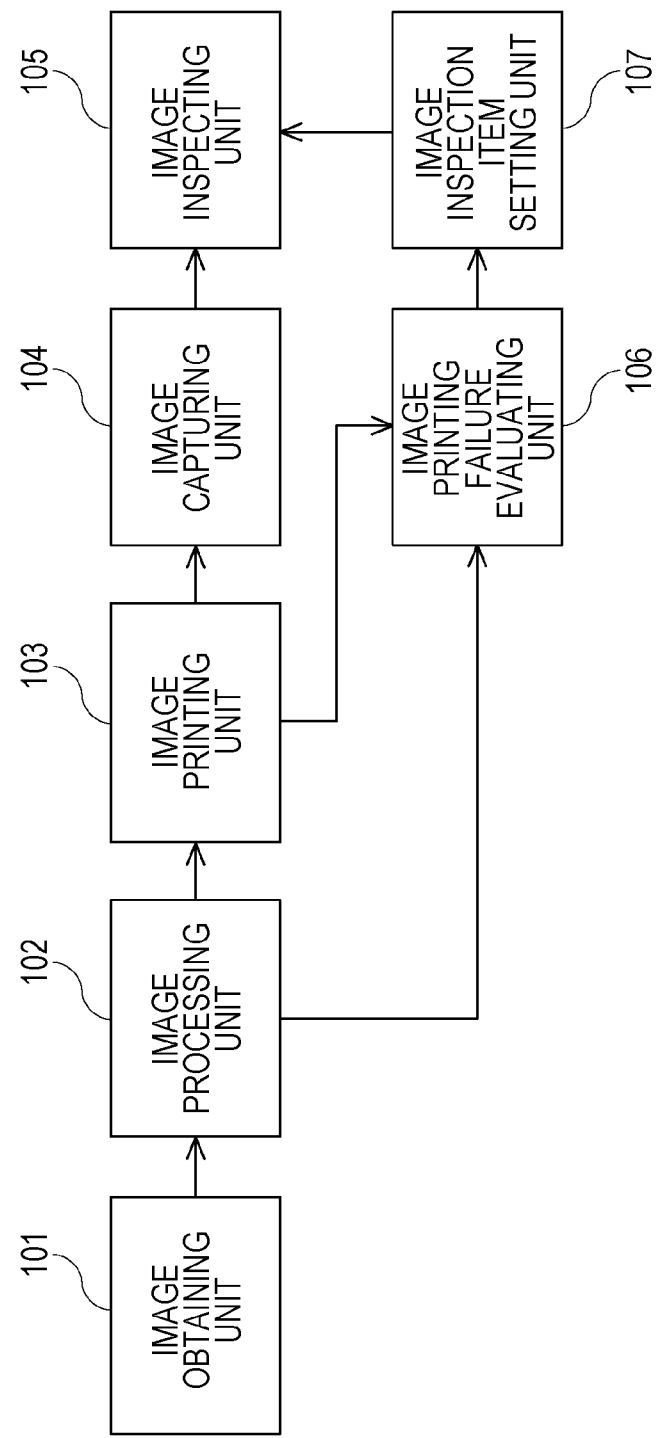
FIG. 1 illustrates image processing according to the present invention.

FIG. 1 illustrates a flow of image processing according to this embodiment. An image processing unit 102 performs image processing on input data obtained by an image obtaining unit 101. An image printing unit 103 prints the image-processed print data on a printing medium. An image capturing unit 104 captures an image printed on a printing medium to read and thus obtain captured image data. An image printing failure evaluation unit 106 evaluates printing failure items with respect to an image to be printed on a printing medium by the image printing unit 103 and its possibility of occurrence. The evaluation here is performed based on an ink or inks to be used and a characteristic of a printing element depending on an image processing parameter used by the image processing unit 102 for execution of the image processing. The characteristic of a printing element, the details of which will be described below, may be a temperature characteristic of the printing element or an evaporation characteristic depending on the type of ink to be ejected. An image inspection item setting unit 107 sets an inspection item to be inspected by an image inspecting unit 105 based on a result of the evaluation of an image printing failure. The image inspecting unit 105 inspects inspection data generated from captured image data with respect to a set inspection item.

The term "printing failure" refers to a state that information not contained in image data obtained by the image obtaining unit 101 is printed in an image printed on a printing medium or a state that a part of information included in image data input by the image obtaining unit 101 is not printed. In other words, a printing failure occurs due to at least one of the image processing unit 102 and the image printing unit 103. A printing failure such as unevenness due to a density difference and printing omission may further be caused by variations of an ejection state of the printing element in the image printing unit 103.

For each of printed images, an evaluation value that evaluates possibilities of occurrence of inspection items for a plurality of types of printing failure is calculated. Based on the calculated evaluation value, the image inspection item setting unit 107 sets an inspection item.

Figure 2A:
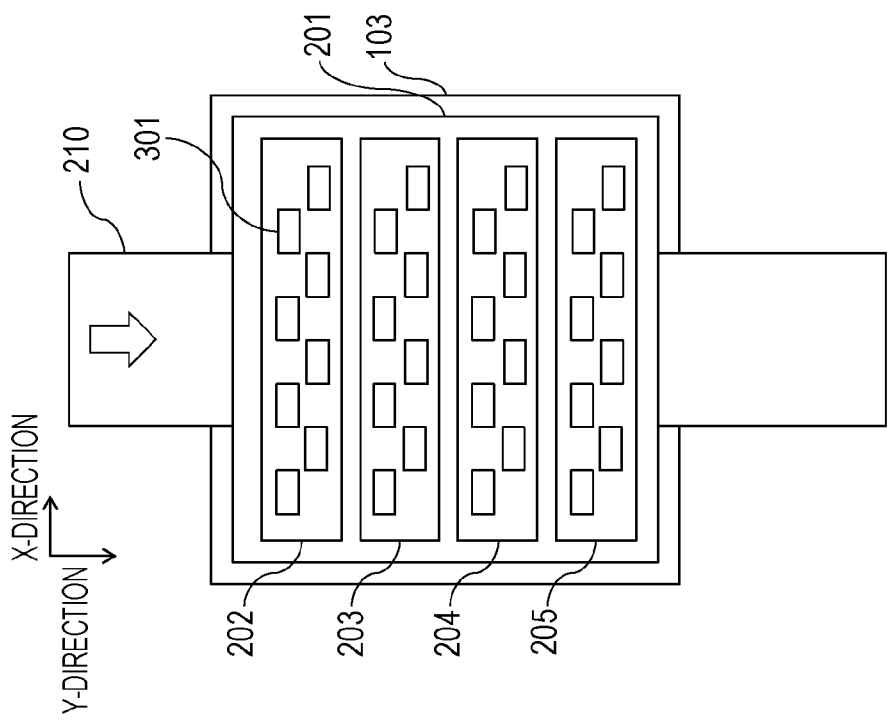
FIGS. 2A and 2B illustrate an ink jet printer having a line head.
Figure 2B:
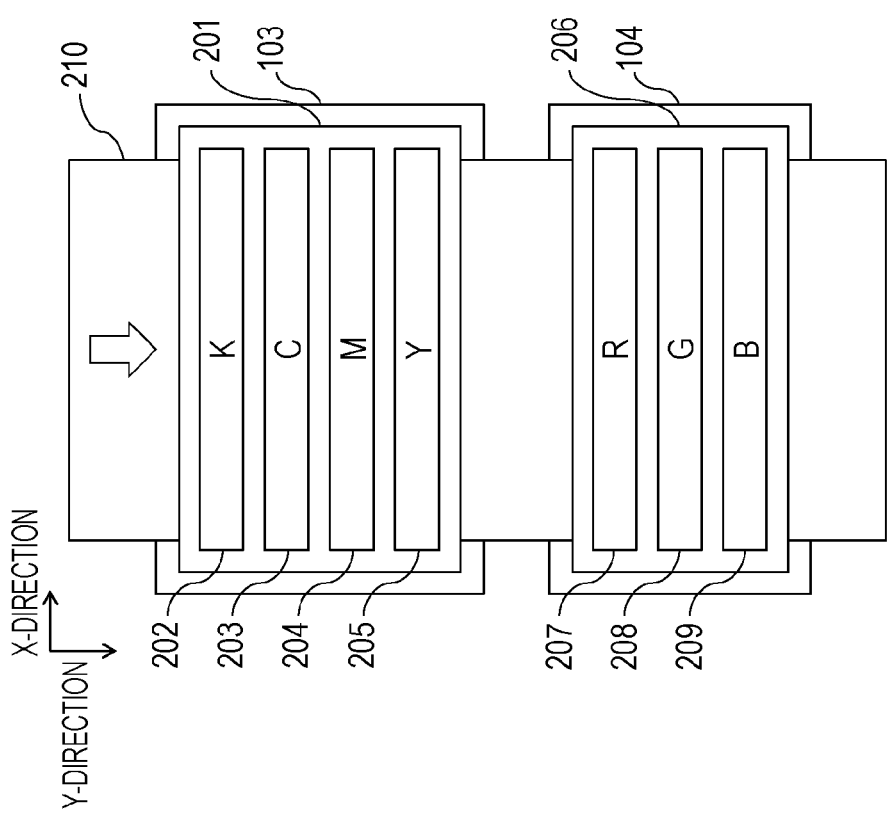

FIGS. 2A and 2B are schematic diagrams illustrating an image printing apparatus including the image printing unit 103 and the image capturing unit 104. According to this embodiment, a printing device 201 including the image printing unit 103 is an inkjet type printing element which ejects ink. The printing device 201 has a K-head 202, a C-head 203, an M-head 204, and a Y-head 205 which eject black (K), cyan (C), magenta (M), and yellow (Y) inks, respectively. An image capturing device 206 included in the image capturing unit 104 is a scanner in this embodiment but may be any other image capturing device. The image capturing device 206 has an R-sensor 207, a G-sensor 208, and a B-sensor 209 which capture a red (R) component, a green (G) component, and a blue (B) component. A printing medium 210 is conveyed in a direction (Y-direction in drawings) that intersects with the printing device 201 and the image capturing device 206. While FIG. 2A illustrates the printing device 201 and the image capturing device 206 as of a full-line type, they may be of a serial type. As illustrated in FIG. 2B, the image printing unit 103 according to this embodiment has a printing head including four chips for each ink color.

Figures 3A, 3B:
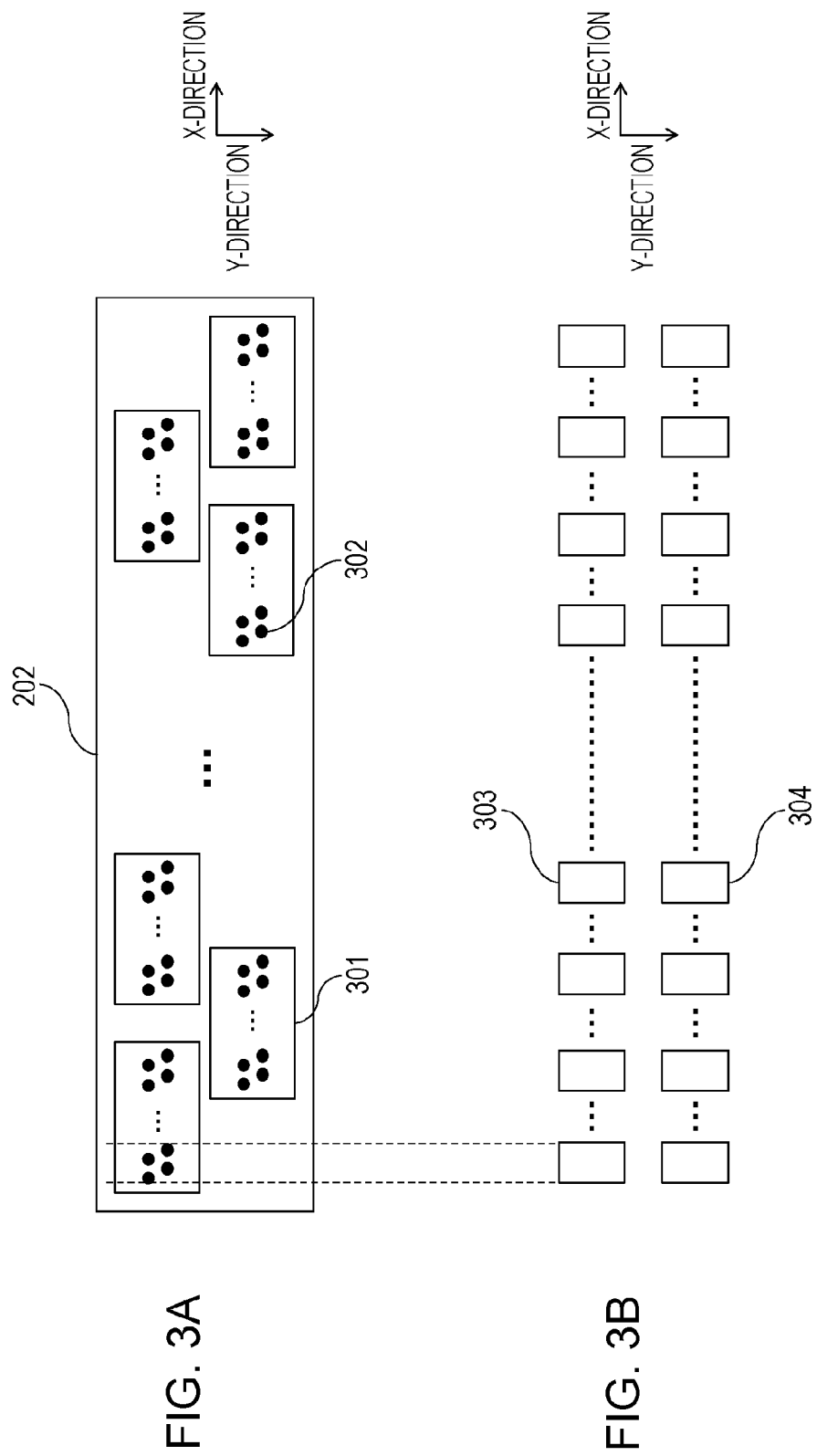
FIGS. 3A and 3B illustrate a relationship between a line head and a correction table.

FIG. 3A is a schematic diagram of the K-head 202. The K-head 202 includes a plurality of chips (ejection substrates) 301 having a plurality of nozzles 302 that are printing elements. Inks are ejected from the nozzles of each of the chips in each of the heads included in the printing device 201 and are applied onto a printing medium for image printing. It should be noted that a printing head which ejects another ink may be configured similarly to the K-head 202.

Because of manufacturing errors of the chips 301, the amounts of ink droplets ejected from the nozzles 302 may vary between the nozzles, the details of which will be described below. Manufacturing error variations may be present also between the chips. This may result in variations in density characteristics of printed images between the nozzles and chips, which may cause color unevenness in some cases. To correct such color unevenness, a color shading (CS) unit 402 and a head shading (HS) unit 404 perform correction processing.

FIG. 3B illustrates regions for which the correction tables to be used by the CS unit 402 and the HS unit 404 are changed. A CS table region 303 and an HS table region 304 are set to be changed every corresponding predetermined numbers of nozzles. Here, the size of the region in an X-direction corresponds to four nozzles. The correction tables may be changed in accordance with a characteristic of a printing element on each region for unevenness correction.

Figure 4:
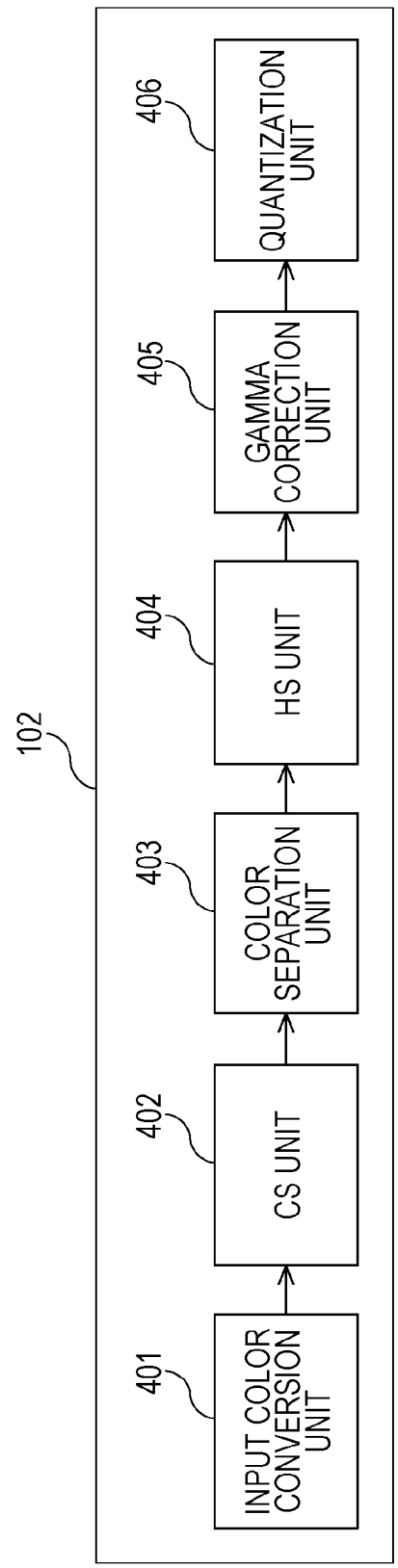
FIG. 4 illustrates a flow of image processing.

FIG. 4 illustrates a configuration of the image processing unit 102. According to this embodiment, RGB multi-valued data is input from the image obtaining unit 101. An input-color converting unit 401 converts input RGB data to data in a color reproduction region of the image printing unit 103 to generate R'G'B' multi-valued data. The CS unit 402 performs processing for correcting multi-color unevenness due to a printing characteristic of the image printing unit 103 on the R'G'B' data to generate R"G"B" multi-valued data. A color separation unit 403 performs color separation on ink color data of the image printing unit 103 based on the R"G"B" data to generate multi-valued CMYK data. The HS unit 404 performs processing for correcting a primary color unevenness due to a printing characteristic of the image printing unit 103 on the multi-valued CMYK data to generate multi-valued C'M'Y'K' data. A gamma correction unit 405 performs processing for correcting a density characteristic of an output for an input to the image printing unit 103 on the C'M'Y'K' data to generate multi-valued C"M"Y"K" data. This color conversion is performed by using corresponding lookup tables. A quantization unit 406 quantizes the C"M"Y"K" data to generate binary data. The quantization process may apply an error diffusion method or a dithering method. According to this embodiment, the generated binary data is binary data of 1 bit for each of C, M, Y and K. A pixel with binary data 0 corresponds to ink non-ejection, while a pixel with binary data 1 corresponds to ink ejection. The image printing unit 103 ejects ink to a printing medium based on such binary data. The image processing such as conversion, correction, and color separation is executed by the image processing unit 102 based on an image processing parameter. Such an image processing parameter may vary in accordance with the type of printing medium, printing mode (such as color-print or monochrome print or high image quality printing or low image quality printing).

Figure 5:
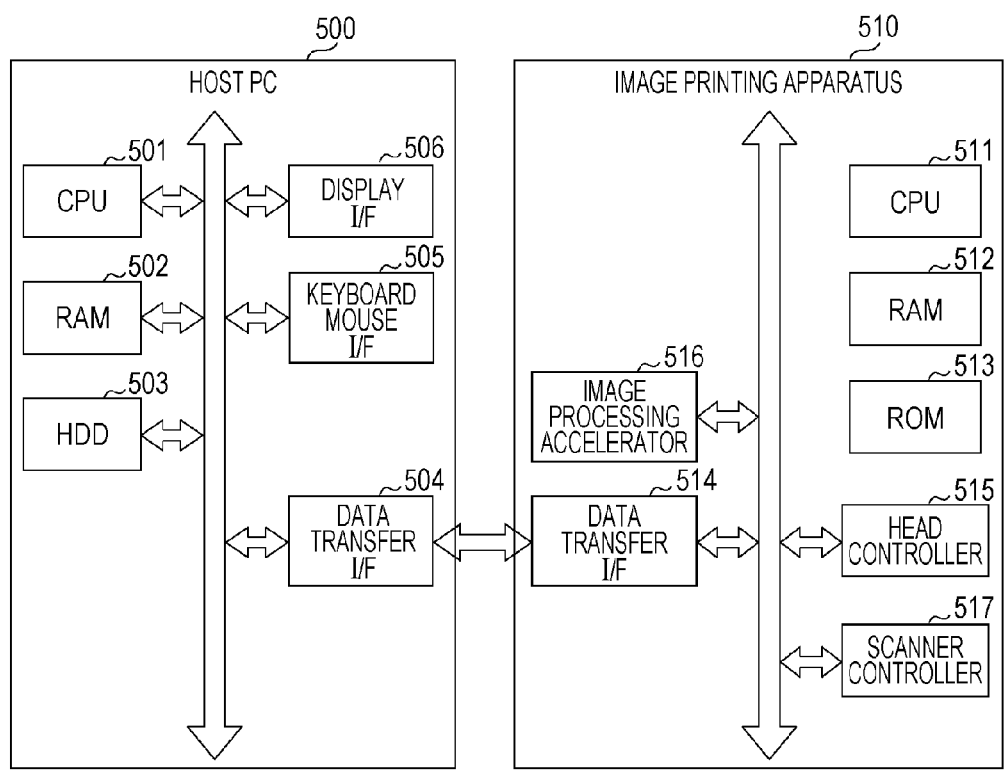
FIG. 5 illustrates a system configuration according to the present invention.

FIG. 5 is a block diagram illustrating a system configuration according to this embodiment. FIG. 5 illustrates an image printing apparatus 510 which is also illustrated in FIG. 2A. A host PC 500 is a host configured to transmit print data to an image printing apparatus and mainly includes the following blocks: A CPU 501 is a block configured to execute a process based on a program held in an HDD 503 or a RAM 502. The RAM 502 is a volatile storage configured to temporarily hold a program and data. The HDD 503 is a nonvolatile storage configured to hold a program and data. A DATA TRANSFER I/F 504 is a block configured to transmit and receive data to and from the image printing apparatus 510. A USB/IEEE 1394/LAN may be used as a physical connection method. A KEYBOARD MOUSE I/F 505 is an interface (I/F) usable for controlling a Human Interface Device (HID) such as a keyboard and a mouse and receives an input from a user. A DISPLAY I/F 506 is a block configured to display a screen.

The image printing apparatus 511 mainly includes the following blocks. The blocks described above with respect to FIG. 1 are included in the image printing apparatus 510. A CPU 511 is a block configured to execute a process based on a program held in a ROM 513 and a RAM 512. The RAM 512 is a volatile storage configured to temporarily hold a program and data. The ROM 513 is a nonvolatile storage configured to hold a program and data. A DATA TRANSFER I/F 514 is a block configured to transmit and receive data to and from the host PC 500. USB/IEEE 1394/LAN may be used as a physical connection method. A HEAD Controller 515 is a block configured to supply print data to the printing device 201 which will actually print it for print control. As a more specific implementation example, the HEAD Controller 515 may be designed to read a necessary parameter and data from a predetermined address in the RAM 512. When the CPU 511 writes a necessary parameter and data to the predetermined address in the RAM 512, the HEAD Controller 515 activates and the corresponding image is printed. An Image Processing Accelerator 516 is a block configured to execute image processing at a higher speed than the CPU 511. As a specific implementation example, the Image Processing Accelerator 516 may be designed to read a necessary parameter and data from a predetermined address in the RAM 512. When the CPU 511 writes a necessary parameter and data to the predetermined address in the RAM 512, the Image Processing Accelerator 516 activates and performs actual image printing. The Image Processing Accelerator 516 is not always necessary, but the image processing may be implemented by processing performed by the CPU 511. A SCANNER Controller 517 is a block configured to perform image capturing control over the image capturing device 206 which captures an image printed on a printing medium.

Relationships between the blocks in FIG. 1 and blocks in FIG. 5 will be described. The image obtaining unit 101 corresponds to the DATA TRANSFER I/F 514 and obtains input data transferred from the host PC 500 through the DATA TRANSFER I/F 504. The image processing unit 102, image inspecting unit 105, image printing failure evaluation unit 106, and image inspection item setting unit 107 correspond to the CPU 511 and reads out a program stored in the ROM 513 to the RAM 512 and performs image processing on input data. The image printing unit 103 corresponds to the HEAD Controller and controls the printing device 201 to print an image. The image capturing unit 104 corresponds to the SCANNER Controller 517. It should be noted that necessary data may be transferred to the host PC 500 through the DATA TRANSFER I/F 514 and DATA TRANSFER I/F 504 and may undergo data processing in the host PC 500.

Figure 6:
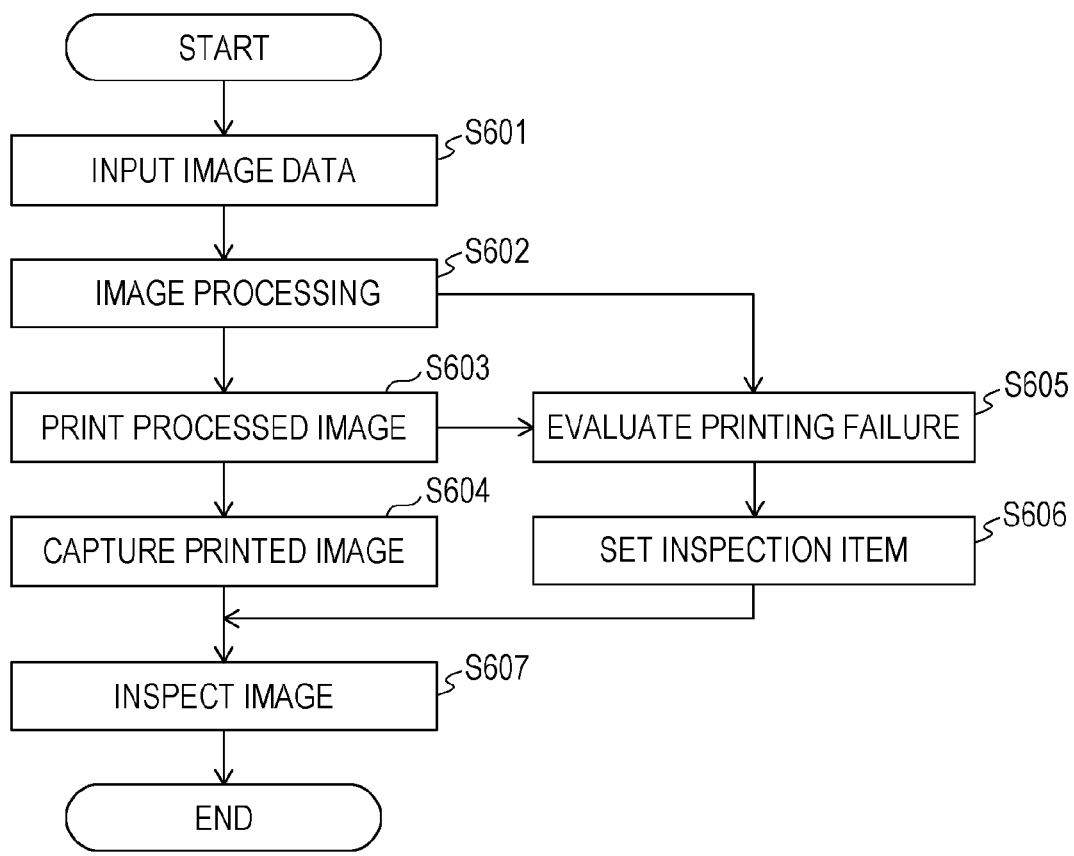
FIG. 6 illustrates a flow according to a first embodiment.

FIG. 6 is a flowchart according to this embodiment. In step S601, the image obtaining unit 101 inputs image data. In step S602, the image processing unit 102 performs image processing on the input data by using an image processing parameter based on the type of printing medium on which the image is to be printed and a selected print mode to generate print data. In step S603, the image printing unit 103 prints the image on the printing medium based on the print data. In step S604, the image capturing unit 104 captures the image on the printing medium and obtains RGB data thereof. It should be noted that the image-capturing resolution here is equal to that of the input image data. In step S605, the image printing failure evaluation unit 106 evaluates a possibility of occurrence of a printing failure with respect to each of a plurality of inspection items. This evaluation is based on the type of ink to be used for image printing depending on the image processing parameter used in step S602 and characteristics of chips in the printing head for the ink to be used. Details of the evaluation method will be described below. In step S606, the image inspection item setting unit 107 sets an inspection item against a printing failure based on an evaluation result acquired in step S605. In step S707, the image inspecting unit 105 inspects the image captured in step S604 with respect to the inspection item set in step S606.

The order of execution of step S603 to step S606 will be described below. Between step S603 and step S604, step S603 is executed first. Between step S605 and step S606, step S605 is executed first. The flow from step S603 to step S604 and the flow from step S605 to step S606 may be performed in parallel.

Next, the evaluation of a printing failure caused by a printing characteristic of an image printing unit (step S605), the setting of an inspection item (step S606), and the inspection with respect to an inspection item (step S607) will be described in detail below.

Figure 7A:
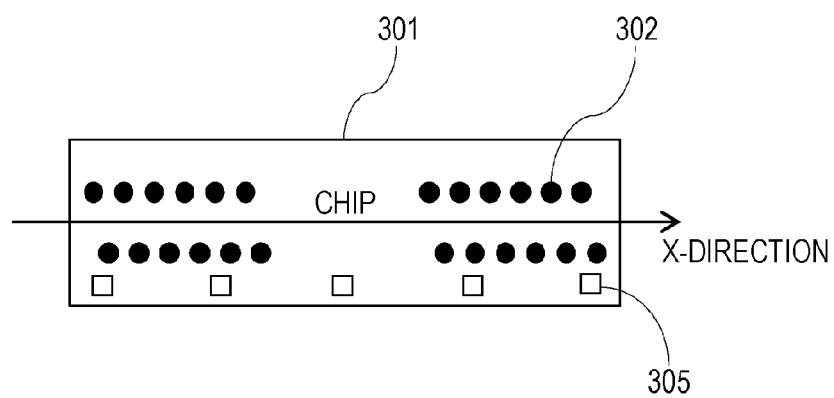
FIGS. 7A and 7B illustrates a temperature characteristic of a chip.
Figure 7B:
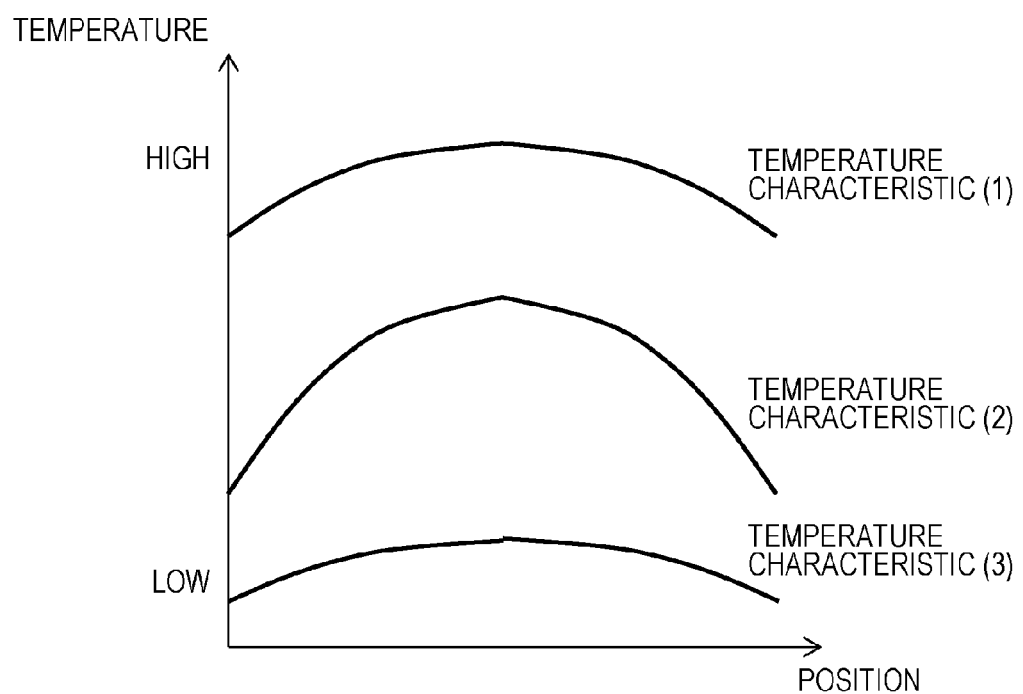

FIGS. 7A and 7B illustrate ink temperatures of a surrounding area to a central area to a surrounding area within the chip 301 obtained by the temperature-sensor 305 in the X-direction of the chip 301. According to this embodiment, five temperature-sensors 305 are provided in the X-direction of FIG. 7A in each one chip. A printing characteristic of the image printing unit 103 is not always constant but varies in accordance with the frequency of ejection of and the temperature of ink. For example, in a case where the printing device 201 is of a thermal type, ink droplets are ejected by applying heat to a heating device of an ink-jet printing element. In this case, when a heat dissipation amount from the heating device exceeds an accumulated heat amount, the ink temperature increases, which increases the temperatures of the head 202, chip 301, and nozzles 302. Because the heat dissipation amount differs between surrounding areas and a central area of each chip, the ink temperatures within the chip may differ. Even within a chip, a surrounding area tends to have a lower temperature than a central area. This is because heat may easily dissipate in a surrounding area to a member external to the chip.

FIG. 7B illustrates temperature characteristics (1) to (3) produced by heat generated within the chip. The temperature characteristic (1) may be produced in a case where an image is printed with a high concentration which may be acquired by ejecting ink droplets serially, for example. On the other hand, the temperature characteristic (3) may be produced in a case where the frequency of ejection of ink droplets is low. The temperature characteristic (3) exhibits a lower temperature than the temperature characteristic (1). The temperature characteristic (2) may be produced in a case where the frequency of ejection of ink droplets is medium and distributes between the temperature characteristic (1) and the temperature characteristic (3). It should be noted that the temperature characteristics in FIG. 7B may vary in accordance with the configurations and materials of the heating device, chip, head, and ink supply system. Therefore, temperature characteristics of a printing apparatus may be required to be measured in advance.

In general, a thermal-type ink-jet printing apparatus may eject an amount of ink droplets that may vary in accordance with the ink temperature. Ejection of a larger amount of ink droplets may result in an image printed with a higher density while ejection of a lower amount of ink droplets may result in an image printed with a lower density. Therefore, when temperatures of inks within the head, chips and nozzles are different from each other, there is a high possibility that a printed image have unevenness due to density differences.

As illustrated in FIG. 2A and FIG. 3A, a thermal-type ink-jet printing element may apply different nozzles to eject ink droplets in accordance with the input image data, the type of printing medium and the image printing mode. Because RGB data may differ depending on input images, the ink color data and binary data generated by image processing may vary as described with respect to FIG. 4, and different nozzles are to be used. Because different image processing parameters are used depending on the printing medium and image printing mode to be used, different nozzles are to be used depending on the image processing parameters.

As described above, the possibility of occurrence of unevenness due to density differences in an image may vary depending on the ink temperatures of nozzles to be used for printing the image. Accordingly, in order to evaluate the possibility of occurrence of unevenness due to density differences, identifying a nozzle to be used for printing an image may at least be required to obtain the temperature of the chip having the nozzle.

Next, an example of an inspection item will be described excluding unevenness due to density differences due to a change of the amount of ink droplets depending on a temperature characteristic as described above. As already described, the ink-jet printing apparatus ejects ink droplets from the nozzles 302 to print an image. Ink physical properties of the nozzles 302 may vary depending on time differences from the last ejection of ink droplets performed by the nozzle 302. Such time differences may advance the evaporation of moisture from of inks in the nozzles 302 from their nozzle tips and increase the viscosity and density of the inks, which may cause sticking matters in the nozzles. Increased viscosity of inks may result in difficulty of ejection of ink droplets from the nozzles 302, which may cause fade in a printed image. Increased density of ink may increase the density of an image printed with ink droplets ejected from the nozzles 302, which may cause unevenness due to a density difference. High-viscosity of ink and occurrence of a sticking matter may reduce accuracy of landing positions of ink droplets ejected from the nozzles 302 to a printing medium. When landing positions deviate from the original pixel positions to adjacent pixel positions, the density at the original pixel positions may be lower while the density at adjacent pixel positions may be higher. Thus, streaks due to the density difference may occur. Accordingly, in order to evaluation the possibilities of occurrence of a fade, density difference unevenness and streaks, identifying the head having nozzles to be used may at least be required to identify the evaporation characteristic of the head. For easy understanding of the following description, an example will be described in which an image is printed by using a head having four chips for corresponding ink colors, as illustrated in FIG. 2B.

FIG. 8A is a flowchart illustrating evaluation of a printing failure in an image in the image printing failure evaluation unit 106, setting of an inspection item in the image inspection item setting unit 107 and inspection of an image in the image inspecting unit 105. Step S801A to step S804A correspond to step S605 in FIG. 6. Step S805A corresponds to step S606 in FIG. 6. Step S806A to step S808A correspond to step S607 in FIG. 6.

In step S801A, the image printing failure evaluation unit 106 obtains ink color data from the image processing unit 102. The ink color data here is binary data after a quantization process.

As described above, according to this embodiment, the binary data is 1-bit data for each ink color. When the data is "1", ink droplets are to be ejected. Therefore, an ink color for which obtained binary data contains "1" is judged as an ink color to be used for printing.

Figure 9:
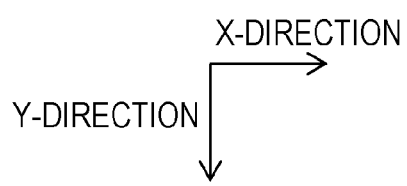
FIG. 9 illustrates ink colors to be used in a predetermined region of a whole image.

FIG. 9 illustrates ink colors of a head to be used for a plurality of regions of a whole image. According to this embodiment, a length in the X-direction of each of the regions corresponds to a length in the X-direction of the chip 301 in FIG. 2B, and the size in the Y-direction is equal to a one-sixth length of the length in the Y-direction of the entire image.

Ink colors to be used for the regions may be judged based on whether the regions have the binary data "1" indicative of ejection of ink droplets or not. Alternatively, binary data "1" of each of the regions may be counted, and the ratio of "1" counted from pixels included in the region may be defined as a print duty. If the print duty is equal to or higher than a predetermined threshold value, the ink may be judged as the ink to be used for the region. Because the visibility of unevenness due to density differences differs depending on the print duty, the accuracy for setting an inspection item for the printed image may be improved in consideration of the print duty. Such a color of an ink to be used for each predetermined region may be stored in the RAM 512.

It should be noted that the size of such a region is not limited to those described above but may be set in accordance with the size for printing failure evaluation, which will be described below. For example, in a case where an evaluation is performed on the CS table region 303 and the HS table region 304, the length in the X-direction may be set equally to the length of the CS table region 303 and HS table region 304.

Next, in step S802A, the image printing failure evaluation unit 106 obtains the temperature of the ink from the image printing unit 103. According to this embodiment, as illustrated in FIG. 7A, the plurality of temperature-sensors 305 are disposed at different positions in the X-direction in the chip 301. From temperatures obtained at a plurality of positions in each chip, a temperature characteristic of the ink in the X-direction within the chip may be identified. Such temperatures may be obtained every predetermined period of time or may be obtained different timings such as before, in the middle of and after printing an image.

Figure 10A:
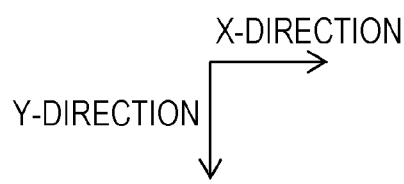
FIGS. 10A and 10B illustrate temperature characteristics in a predetermined region of a whole image.
Figure 10B:
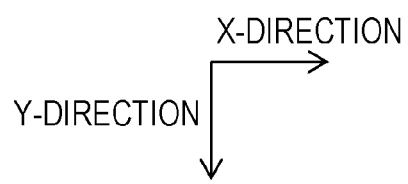

FIGS. 10A and 10B illustrate temperature characteristics of regions. The temperature characteristic of each of the regions is determined from the temperature characteristics (1) to (3) in FIG. 7B based on a result of detection performed by the temperature-sensor of the temperature of a printing head to be used for printing the region. Because ink colors to be used are C and Y as illustrated in FIG. 9, FIG. 10A illustrates a temperature characteristic of C while FIG. 10B illustrates a temperature characteristic of Y. As described above, the length in the X-direction of each of the regions is equal to the length of in the X-direction of the chip 301, and the length in the Y-direction is equal to the one-sixth of the length in the Y-direction of the whole image. When an image is printed on the regions, the temperature-sensors may obtain temperatures a plurality of number of times so that temperatures at a plurality of points may be obtain in the Y-direction. The average value of the plurality of temperatures obtained by each of the temperature-sensors may be handled as an average temperature at the position of the corresponding temperature-sensor in the X-direction. From a plurality of average temperatures in the X-direction, the temperature characteristic within the corresponding region may be determined. The temperature characteristic of the ink to be used for the region is stored in the RAM 512.

In step S803A, the image printing failure evaluation unit 106 determines whether step S801A and step S802A have been completed for the entire image or not. If not, the flow returns to step S801A. If so, the flow proceeds to step S804A.

In step S804A, the image printing failure evaluation unit 106 evaluates the possibility of occurrence of a failure with respect to each printing failure inspection item to acquire an evaluation value. In this case, evaluation values are acquired for the four inspection items of "unevenness due to density differences caused by changes of the amount of ink droplets", "fade due to difficulty of ejection of ink droplets", "unevenness due to density differences caused by changes of the ink concentration", and "streak due to density differences caused by landing position deviations of ink droplets". A five grade evaluation system may be applied for the evaluation. An evaluation value of "5" is acquired for the highest possibility of occurrence of a failure while an evaluation value of "1" is acquired for the lowest possibility of occurrence of a failure.

FIGS. 11A to 11D are tables illustrating evaluation points each indicative of a possibility of occurrence of a printing failure against a temperature characteristic of an ink to be used with respect to each inspection item. A higher point number means that the item is more required to be inspected. On the tables, evaluation points are set separately for a case where an ink of one color is only used to print a monotonous image and a case where inks of two or more colors are used to print a multi-color image. It should be noted that in a case where a multi-color image is to be printed, one of temperature characteristics (1) to (3) is obtained for each of inks to be used, and the temperature characteristic among them is determined as one of (1) to (3) with reference to a preset priority order. According to this embodiment, priority order is given from temperature characteristic (2) with a largest temperature difference within a chip, temperature characteristic (1) with a small temperature difference but a highest average temperature within a chip, and temperature characteristic (3) with a lowest average temperature. A temperature characteristic of a given region is determined in decreasing order of the priority order of the temperature characteristics of each ink to be used. For example, in a case where the temperature characteristic of C in one region is the temperature characteristic (3), the temperature characteristic of M is the temperature characteristic (2), and the temperature characteristic of Y is the temperature characteristic (1), the temperature characteristic (2) having the highest priority order is determined as the temperature characteristic of the region. Similarly, in a case where the temperature characteristic of C is the temperature characteristic (3), the temperature characteristic of M is the temperature characteristic (1), and the temperature characteristic of Y is the temperature characteristic (3), the temperature characteristic (1) having the highest priority order is determined. It should be noted that an evaluation point for each ink multi-color may be set for a region where an image is to be printed. An evaluation point may be set in accordance with the brightness of an ink. Inks according to this embodiment are Y, M, C, and K in decreasing order of brightness.

Figure 12:
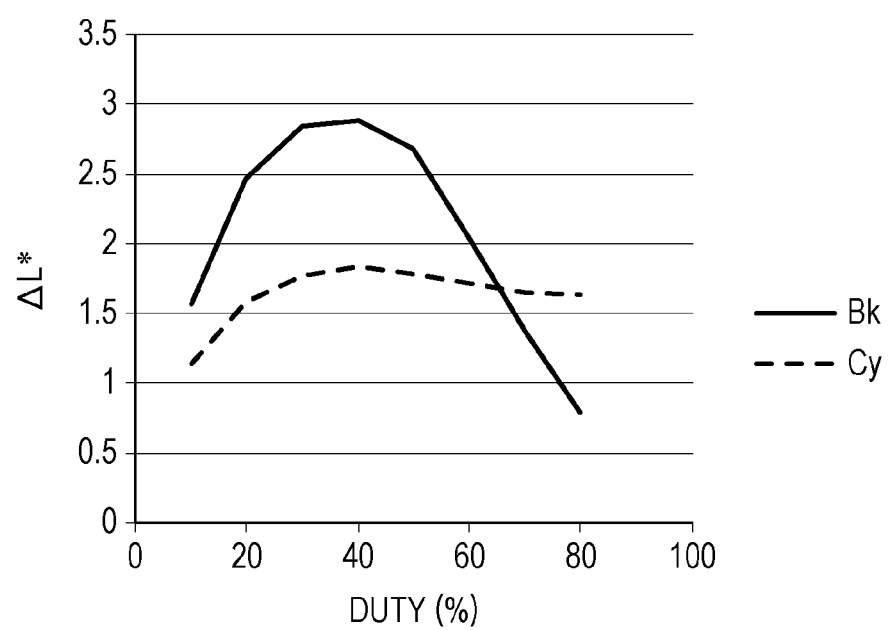
FIG. 12 illustrates an amount of ink droplet and lightness.

FIG. 12 illustrates variations of lightness of a K ink and a C ink against print duty in a case where the amount of ink droplet changes by 6%. Approximately, the K ink has a larger fluctuation in lightness. When the amount of ink droplet changes, the area that covers paper changes. However, because the difference in lightness of a printing medium increases as the lightness of an ink covering the paper decreases, the lightness changes largely. In consideration of this point, an evaluation point is set higher for an ink with a lower lightness in FIGS. 11A to 11D.

It should be noted that the correction tables to be used by the CS unit 402 and HS unit 404 are changed over in accordance with the printing characteristic of each region of the head. In general, a printing characteristic of each region is obtained by capturing an image of a test pattern printed on a printing medium and analyzing the captured image. Therefore, the correction tables to be used by the CS unit 402 and HS unit 404 are set so as to further correct unevenness due to density differences caused by a temperature characteristic appearing when a test pattern is printed. The evaluation tables in FIGS. 11A to 11D define evaluation points in a case where the correction tables for the CS unit 402 and HS unit 404 are set based on the printing characteristic obtained when the temperature characteristic of the printing head is the temperature characteristic (3). In other words, the temperature characteristic (3) is referred. Because the temperature characteristic (2) has a particularly large difference between a highest temperature and a lowest temperature, which causes a change of the amount of ink droplet, FIGS. 11A to 11D define such that the evaluation point with "unevenness due to density differences caused by changes of the amount of ink droplets" are set higher in a case where the temperature characteristic of an ink to be used is the temperature characteristic (2). The priority order is also set highest for a case where inks of a plurality of colors are to be used.

On the other hand, the temperature characteristic (1) has a large average temperature difference than the temperature characteristic (2) with respect to the reference temperature characteristic (3) but has a small difference between a highest temperature and a lowest temperature. According to this embodiment, a change of the amount of ink droplet due to an average temperature difference may be controllable by adjustment of energy to be applied to a printing element through the HEAD Controller 515. For example, such energy may be adjusted in accordance with an average value of values detected by a plurality of temperature-sensors provided within a chip to control a difference in amount of ink droplet of the temperature characteristic (1) from the temperature characteristic (3). Therefore, the "unevenness due to density differences caused by changes of the amount of ink droplets" is set so that the evaluation point for the temperature characteristic (1) may be low. It should be noted that the adjustment of the amount of ink droplet is performed by the HEAD Controller 515 for each chip but not for each nozzle. Therefore, the evaluation value of the temperature characteristic (2) with a large difference between a highest temperature and a lowest temperature is set higher for the "unevenness due to density differences caused by changes of the amount of ink droplets".

Evaluation based on a temperature characteristic within a chip is performed according to this embodiment though a difference in amount of ink droplet may also be caused by a temperature difference between chips. This is because the amount of ink droplet is adjusted by the HEAD Controller 515 based on an average temperature of each chip, as described above.

The evaluation point tables in FIGS. 11A to 11D define values in consideration of evaporation characteristics each indicative of the degree of evaporation of moisture within ink near a nozzle. As already described with respect to FIGS. 7A and 7B, the temperature does not increase when the frequency of ejection is low. However, a time difference between ejections may increase in that case, compared with a case where the frequency of ejection is high. Therefore, it may be predictable that the evaporation characteristic of the nozzle 302 may be high and the evaporation of moisture near the nozzle may be advancing. Conversely, the time difference between ejections is short when the temperature is high, and therefore it may be predictable that that the moisture near the nozzle evaporates less than a case where the temperature is low. Therefore, when the temperature is low, the evaluation points are set higher for "fade due to difficulty of ejection of ink droplets", "unevenness due to density differences caused by changes of the ink concentration", and "streak due to density differences caused by landing position deviations of ink droplets". Because the "unevenness due to density differences caused by changes of the ink concentration" may occur easily due to evaporation of moisture in ink, the evaluation point therefor is set higher than those for the "fade due to difficulty of ejection of ink droplets" and "streak due to density differences caused by landing position deviations of ink droplets". As described above, the evaluation point tables in FIGS. 11A to 11D substitute temperature characteristics for evaporation characteristics.

Referring back to FIG. 8, in step S805A, the image inspection item setting unit 107 sets an inspection item to be inspected by the image inspecting unit 105 by using the evaluation points of failures acquired in step S804A. How the image inspection item setting unit 107 sets an inspection item will be described below.

FIG. 13 illustrates a method for determining an inspection item according to this embodiment. Row (A) of FIG. 13 provides evaluation points of regions acquired from the evaluation point tables in FIGS. 11A to 11D based on the temperature characteristics of ink colors to be used. FIG. 14A illustrates settings for determining an inspection item from the evaluation points provided in row (A) in FIG. 13. For the evaluation points set as the "evaluation points to be totaled" in FIG. 14A, the evaluation points of the regions in row (A) are totaled. For example, for "unevenness due to density differences caused by changes of the amount of ink droplets", because "5 to 3" is the "evaluation points to be totaled", 1 or 2 is not totaled, but values 3, 4, and 5 are totaled. The values 4 and 5 are totaled up to 70. Each of the "threshold values of total evaluation points" refers to a threshold value to be used for determination on whether it can be an inspection item candidate or not. The "preference" refers to a preference to be used for selecting an item to be inspected by the image inspecting unit 105 from inspection items selected by the determination. The "inspection time for entire image" refers to a time period required for inspecting an entire image.

Next, Row (B) of FIG. 13 provides results of the totaling of evaluation points of inspection items in (A) based on the evaluation points to be totaled in FIG. 14A. The evaluation point for "unevenness due to density differences caused by changes of the amount of ink droplets" is 70, the evaluation point for "fade due to difficulty of ejection of ink droplets" is 6, the evaluation point for "unevenness due to density differences caused by changes of the ink concentration" is 10, and the evaluation point for "streak due to density differences caused by landing position deviations of ink droplets" is 6. Based on the threshold values of total evaluation points in FIG. 14A, all of the inspection items are beyond the threshold values, they can be inspection item candidates. Here, total inspection time for inspection items being inspection object candidates are T+3T+2T+3T=9T. According to this embodiment, the inspection time from capturing an image by the image capturing unit 104 to the end of inspection performed by the image inspecting unit 105. However, all of inspection items being inspection object candidates may not be inspected within the time period 5T. Accordingly, the inspection items are determined based on the preferences in FIG. 14A. In order from the highest preference, a total inspection time 4T (=T+3T) of "unevenness due to density differences caused by changes of the amount of ink droplets" and "fade due to difficulty of ejection of ink droplets" is within the inspection time 5T. Thus, two of the items "unevenness due to density differences caused by changes of the amount of ink droplets" and "fade due to difficulty of ejection of ink droplets" are determined and set as inspection items to be executed.

According to this embodiment, inspections with respect to the set inspection item or items are executed on an entire image, for example. However, an inspection item and an inspection region may be set. FIG. 14B illustrates examples of settings for determining an inspection item and an inspection region. Row (C) in FIG. 13 provides total sizes of regions to be inspected for inspection items in a case where the region size of an entire image is 1. For example, for "unevenness due to density differences caused by changes of the amount of ink droplets", 16 out of 24 regions are regions to be inspected, and the size is equal to $2/3$. Similarly, row (C) provides $1/12$ for "fade due to difficulty of ejection of ink droplets", $1/12$ for "unevenness due to density differences caused by changes of the ink concentration", and $1/12$ for "streak due to density differences caused by landing position deviations of ink droplets". The inspection times of inspection items for the sizes to be inspected are $2/3$T (=$2/3$×T), $1/4$T (=$1/12$×3T), $1/6$T (=$1/12$×2T), and $1/4$T (=$1/12$×3T), respectively, based on the inspection times of the entire image illustrated in FIG. 14B. The total inspection time is equal to $4/3$T (=$2/3$T+$1/4$T+$1/6$T+$1/4$T). When the printing speed increases, the inspection time may possibly be shorter than 5T. In this case, the inspection may be performed only on a region determined to be inspected. For example, assuming that the inspection time is T, the total inspection time for "unevenness due to density differences caused by changes of the amount of ink droplets" and "fade due to difficulty of ejection of ink droplets" is equal to $11/12$T (=$2/3$T+$1/4$T) that is within the allowable inspection time T. Thus, "unevenness due to density differences caused by changes of the amount of ink droplets" and "fade due to difficulty of ejection of ink droplets" may be determined as inspection items, and the regions to be inspected for the inspection items may be set as inspection regions.

Next, an inspection method to be performed by the image inspecting unit 105 will be described. In step S806A, reference data to be compared with captured image data as a reference for inspection is generated based on input image data. Then, in step S807A, inspection data to be an inspection object of an inspection is generated based on the captured image data.

Figure 15A:
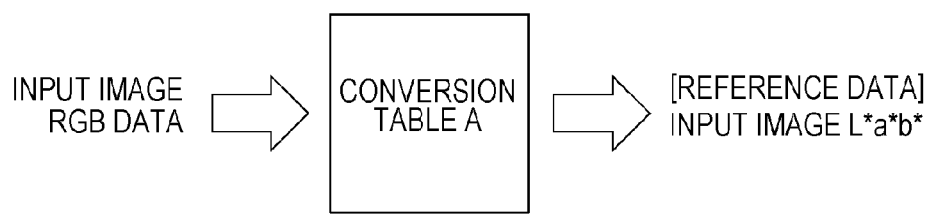
FIGS. 15A and 15B illustrate a conversion to a standard color space L*a*b* value.
Figure 15B:
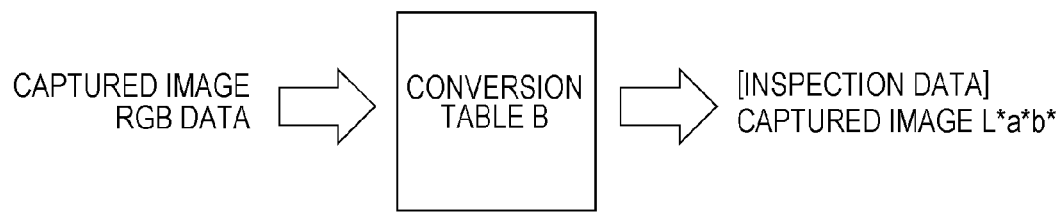

FIG. 15A illustrates a method for generating reference data in step S806A. FIG. 15B illustrates a method for generating inspection data in step S807A. In some cases, one input image may be printed in different colors due to individual differences in characteristics of the image printing units 103. Further in some cases where capturing one printed image may result in different captured image data due to individual differences in characteristics of the image capturing units 104. These differences may occur because there are tolerances for production of the image printing units 103 and image capturing units 104.

In step S808A, because reference data and inspection data are compared for inspection, the comparison may be easier if the two types of data are in a same color space. For the following description, reference data and inspection data are assumed as L*a*b* data being a standard color space, for example. The reference data is generated by converting RGB data of an input image to L*a*b* data in a standard color space by using a conversion table A. The inspection data is generated by converting RGB data of captured image to L*a*b* data in a standard color space by using a conversion table B. The conversion tables A and B may be prepared in the following manner. A reference patch including a plurality of colors for which RGB values are available in advance is defined as an input image and is printed on a printing medium by the image printing unit 103. If an operator checks the printed reference patch and determines that the printed reference patch does not have a printing failure, a measuring instrument may be used to measure a L*a*b* value of the reference patch printed on the printing medium. Performing this method may provide the conversion table A usable for conversion of RGB data of an input image to a L*a*b* data. The image capturing unit 104 captures an image of the reference patch which is determined by an operator that it does not have a printing failure to obtain RGB data thereof. Performing this method may provide the conversion table B usable for conversion of RGB data of the captured image to L*a*b* data.

Referring back to FIG. 8, in step S808A, the image inspecting unit 105 executes inspection for the inspection item or items set by the image inspection item setting unit 107 based on the reference data and inspection data.

Figure 16A:
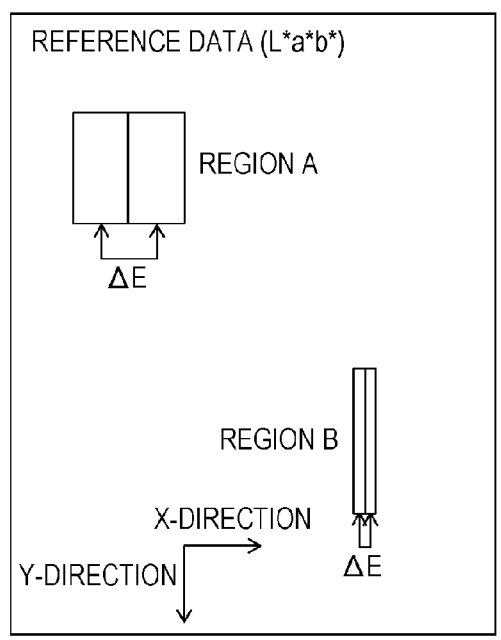
FIGS. 16A and 16B illustrate reference data and inspection data.
Figure 16B:
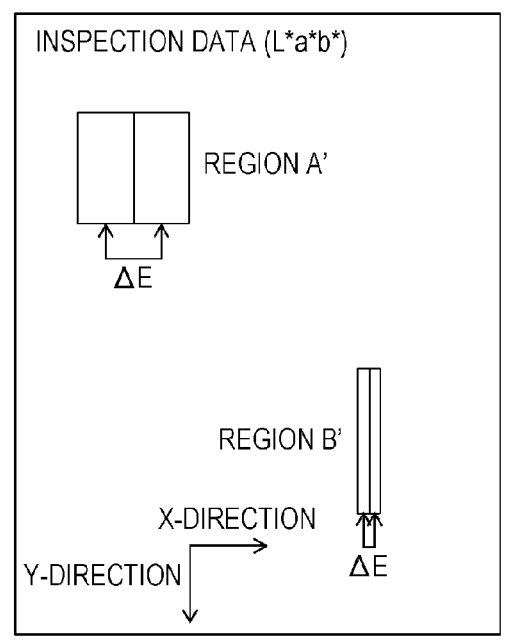

FIGS. 16A and 16B illustrate an inspection method. First, with reference to FIGS. 16A and 16B, a method for executing inspection for "unevenness due to density differences caused by changes of the amount of ink droplets" will be described. Referring to FIG. 16A, inspection regions (region A) on two printing media adjacent to each other in an X-direction to which the nozzle 302 is adjacent is set in reference data for one screen. The two inspection regions are smaller than a predetermined region for setting an inspection item with respect to FIG. 9 and FIGS. 10A and 10B. The X-direction length of each of the inspection regions is set shorter than the X-direction length of the chip 301. This is for inspecting "unevenness due to density differences caused by changes of the amount of ink droplets" occurring due to an ink temperature characteristic within the chip 301 as described above. The Y-direction length of each of the inspection regions is set to a length equivalent to a plurality of pixels. This is because Y-direction data of inspection data illustrated in FIG. 16B is nonuniform even when data of Y-direction pixels of reference data is uniform. Such nonuniformity is caused by a printing scheme by which a tone is represented by a plurality of pixels because binary data of an ink-jet printing apparatus is equal to 1 bit. An average $L^*a^*b^*$ value with respect to the reference data is calculated for the adjacent two inspection regions, and a color difference $\Delta E(A1)$ of the calculated average $L^*a^*b^*$ values is calculated. Such a color difference $\Delta E$ may be calculated by an equation $\Delta E=(\Delta L^{*^2}+\Delta a^{*^2}+\Delta b^{*^2})^{\wedge}$ (½) where differences of the $L^*$ value, $a^*$ value, and $b^*$ value of the average $L^*a^*b^*$ value of each of the inspection regions are equal to $\Delta L^*, \Delta a^*, \Delta b^*$. When $\Delta E(A1)$ is equal to or lower than a preset threshold value $TH(A1)$, a color difference $\Delta E(B1)$ is calculated for the two inspection regions (region A') of the inspection data illustrated in FIG. 16B, which correspond to the two inspection regions (region A) on the reference data. It is not determined as being defective if $\Delta E(B1)$ is equal to or lower than the predetermined threshold value $TH(B1)$ while it is determined as being defective if not. In order to inspect whether inspection data has unevenness due to density differences when reference data does not have unevenness due to density differences, the threshold value $TH(A1)$ is set lower than a color difference with which unevenness due to density differences is visually tolerable. The threshold value $TH(B1)$ is set to a boundary value between a value with which unevenness due to density differences is visually tolerable and a value with which it is not tolerable because the threshold value $TH(B1)$ is a threshold value for determining unevenness due to density differences. For determination on whether unevenness due to density differences is visually tolerable or not, a threshold value may be set based on an experiment in advance including subject evaluations with respect to a plurality of samples having different density differences. On an entire image or a region set as an inspection object, two inspection regions are moved, and the inspection as described above is repeated.

Next, a method for performing inspection for "fade due to difficulty of ejection of ink droplets" will be described. As illustrated in FIG. 16, two adjacent inspection regions (region B) in an X-direction to which the nozzles 302 are adjacent are set in reference data. The Y-direction length of the two inspection regions is set equivalently to a plurality of pixels. The X-direction length of the inspection region may be set shorter than the inspection region of the region A. This is because fade may occur nozzle by nozzle due to difficulty of ejection of ink droplets.

Like the case of the region A, an average $L^*a^*b^*$ value with respect to the reference data is calculated for the adjacent two inspection regions, and a color difference $\Delta E(A2)$ of the calculated average $L^*a^*b^*$ values is calculated. Then, a color difference $\Delta E(B2)$ of the average $L^*a^*b^*$ value for the two predetermined regions (region B') in inspection data corresponding to the two inspection region (region B) in the reference data is calculated. Then, a difference between $\Delta E(A2)$ and $\Delta E(B2)$ is acquired. It is not determined as being detective if the difference is equal to or lower than a preset threshold value $TH(AB2)$ while it is determined as being defective if the difference is higher than the threshold value $TH(AB2)$. A color difference between a measured value from a sample image without fade and a measured value from a sample image from which fade is visually recognized may be acquired in advance through an experiment and may be set as the threshold value $TH(AB2)$. On an entire image or a region set as an inspection object, two inspection regions are moved, and the inspection as described above is repeated.

Next, a method for performing inspection for "unevenness due to density differences caused by changes of the ink concentration" will be described. Here, The X-direction length is set shorter than the inspection region of the region A, and a color difference $\Delta E(A3)$ is calculated from the average $L^*a^*b^*$ value between the adjacent inspection regions with respect to the reference data. The reason for setting shorter than the region A is that unevenness due to density differences caused by some evaporation characteristics of nozzles may occur at a nozzle which does not eject ink though heat may also be propagated to surrounding nozzles and may thus more easily occur in a narrow range than unevenness due to density differences caused by changes of the amount of ink droplets at some temperatures. If the color difference $\Delta E(A3)$ is equal to or lower than the threshold value $TH(A3)$, the color difference $\Delta E(B3)$ between two inspection regions in inspection data corresponding to two inspection regions in the reference data is calculated. It is not determined as being defective if $\Delta E(B3)$ is equal to or lower than the preset threshold value $TH(B3)$ while it is determined as being defective if $\Delta E(B3)$ is higher than threshold value $TH(B3)$. The threshold value $TH(B3)$ may be acquired by the same method as those for the threshold value $TH(A1)$ and threshold value $TH(B1)$. However, unevenness due to density differences caused by changes of the ink concentration may often occur in a narrow region, and the color difference with which unevenness due to density differences is visually tolerable may vary for some sizes of regions having density differences. Accordingly, a different value from the threshold value for "unevenness due to density differences caused by changes of the amount of ink droplets" may be set. On an entire image or a region set as an inspection object, two inspection regions are moved, and the inspection as described above is repeated.

Next, a method for performing inspection for "streak due to density differences caused by landing position deviations of ink droplets" will be described. Like the inspection method described above, two adjacent inspection regions are set. The X-direction length of each of the inspection region is equal to the X-direction length of the inspection region in the region B. A color difference $\Delta E(A4)$ is calculated from the average $L^*a^*b^*$ value with respect to the two inspection regions in the reference data. A color difference $\Delta E(B4)$ is calculated for the two inspection regions in the inspection data corresponding to the two inspection regions in the reference data. A difference between $\Delta E(A4)$ and $\Delta E(B4)$ is calculated. It is not determined as being detective if the difference is equal to or lower than a preset threshold value $TH(AB4)$ while it is determined as being defective if the difference is higher than the threshold value $TH(AB4)$. A color difference between a measured value from a sample image without density difference streak and a measured value from a sample image from which density difference streak is recognized may be acquired in advance through an experiment and may be set as the threshold value $TH(AB4)$. On an entire image or a region set as an inspection object, two inspection regions are moved, and the inspection as described above is repeated.

In step S801A in FIG. 8A, binary data after a quantization process is obtained as ink color data, for example. However, C"M"Y"K" data or C'M'Y'K' data before a quantization process may be obtained to identify an ink to be used in each predetermined region chip by chip. In a case where an HS process is not performed by the HS unit 404, an ink to be used may be identified from CMYK data after a color separation process performed by the color separation unit 403. The relationship of C"M"Y"K" data before a quantization process with respect to input RGB data may be acquired in advance because it depends on an image processing parameter determined based on the type of printing medium and the printing mode, irrespective of an input image. From the relationship acquired in advance between the RGB data and the C"M"Y"K" data and the input image, an ink color to be used for the corresponding predetermined region may be identified.

Having described the processing above with respect to the flowchart in FIG. 8A, the processing may follow the flowchart in FIG. 8B alternatively. It is different from FIG. 8A in that the order of details of processing in step S803A and step S804A are reverse to the order of step S803B and step S804B. In the flowchart in FIG. 8A, after ink color data to be used, which is obtained in step S801A, and a temperature characteristic of the ink obtained in step S802A for the entire image are held in the RAM 512, the evaluation of occurrence of a failure in step S804A is performed. On the other hand, in the flowchart in FIG. 8B, instead of holding the data for the entire image in the RAM 512, the ink color data and temperature characteristic for a predetermined region are obtained, and the evaluation of the occurrence of failure in the predetermined region is then performed. Step S801B to step S803B may be repeated for the entire image so that results of evaluations on individual predetermined regions of the entire image may be obtained. The evaluation results from the entire image are held in the RAM 512.

As described above, according to the present invention, an inspection item is set based on a temperature characteristic during a printing process of an ink used for printing each predetermined region of an image so that both of reduction of the inspection time and suppression of deterioration of inspection accuracy may be achieved. Setting an inspection item based on variations of a printing characteristic of an image printing apparatus may allow inspection for a printing failure due to variations of a state of an ink ejected from a printing element in a printing head. This further improves accuracy of the inspection item setting.

Having described that, according to the method, an ink to be used for individual predetermined regions is identified based on coloring material information in the binary data and C"M"Y"K" data, the coloring material information may be used for the determination for identifying a print duty of an ink to be used and setting an inspection item. As illustrated in FIG. 12, the lightness differences due to differences in amount of ink droplet vary against the print duty, and there may be a higher possibility of occurrence of unevenness due to density differences in an image having a print duty with a large lightness differences due to differences in amount of ink droplet. Accordingly, the evaluation point tables in FIGS. 11A to 11D may be provided for each print duty. In this case, higher evaluation points may be set in an evaluation point table for a print duty with large lightness differences and color differences due to differences in amount of ink droplet against unevenness due to density differences caused by changes of the amount of ink droplets. On the other hand, lower evaluation points may be set for a print duty with small lightness differences and color differences due to differences in amount of ink droplet. For other inspection items than unevenness due to density differences caused by changes of the amount of ink droplets, an evaluation point may be set higher for a print duty with a color difference increased when a failure occurs for improved accuracy of evaluation. For a print duty with a smaller color difference when a failure occurs, an evaluation point may be set lower. Then, the possibility of occurrence of a failure may be evaluated with reference to the evaluation point table corresponding to the print duty identified from the coloring material information to improve the accuracy of the evaluation.

Second Embodiment

According to the first embodiment, the temperature during a printing processing of an ink used for the printing is obtained to evaluate the possibility of occurrence of a printing failure. According to this embodiment, the failure evaluation with respect to "unevenness due to density differences caused by changes of the amount of ink droplets" is performed by using the temperature of an ink used for printing, like the first embodiment. The failure evaluations with respect to "fade due to difficulty of ejection of ink droplets", "unevenness due to density differences caused by changes of the ink concentration", and "streak due to density differences caused by landing position deviations of ink droplets" are performed by using an ejection time difference instead of an evaporation characteristic of the ink.

As described according to the first embodiment, ink may evaporate due to a time difference of ejection of ink droplets from the nozzle 302, by which the ejection characteristic of the ink may change. When one nozzle does not eject ink for a long period of time, moisture near an ejection port at the tip of the nozzle may evaporate, and the ink viscosity may increase thereby, which may result in difficulty of ejection of ink droplets. A sticking matter may be caused near the ejection port, and landing positions may possibly deviate on a printing medium. When a nozzle that has not been used for a long period of time exists near a nozzle which ejects ink highly frequently, the temperature of ink in the nozzle that has not ejected for a long period of time may increase with an increase of ink temperature of the nozzle which ejects highly frequently. In this case, the accuracy of inspection item setting based on a temperature characteristic during a printing process as described according to the first embodiment may possibly deteriorate. On the other hand, according to this embodiment, the evaporation characteristic of each nozzle is predicted based on an elapsed time from the last ejection to suppress deterioration of accuracy of the inspection item setting.

FIGS. 17A and 17B are flowcharts describing evaluation of a printing failure in an image in the image printing failure evaluation unit 106, setting of an inspection item in the image inspection item setting unit 107, and inspection of an image in the image inspecting unit 105. They are different from the flowcharts in FIGS. 8A and 8B according to the first embodiment in that the flowcharts further include step S1703A and step S1703B.

In step S1703A and step S1703B, the image printing failure evaluation unit 106 obtains a time of a printing device. The time here refers to a time difference from the last ejection and is obtained from the image printing unit 103.

The image printing unit 103 counts the time difference from the last ejection to the next ejection for each nozzle. The time difference count value is reset after an ejection. The time difference is obtained from each nozzle for each pixel in the Y-direction. A maximum time difference during a printing process on a predetermined region is held in the RAM 512 as a time difference for the predetermined region. When failure evaluations with respect to "fade due to difficulty of ejection of ink droplets", "unevenness due to density differences caused by changes of the ink concentration", and "streak due to density differences caused by landing position deviations of ink droplets" are performed for each nozzle, the X-direction length of a predetermined region for one pixel is set. In this case, for failure evaluation with respect to "unevenness due to density differences caused by changes of the ink concentration", and "streak due to density differences caused by landing position deviations of ink droplets", the same predetermined region as that for the corresponding ejection time difference may be set for information on an ink color of a used head illustrated in FIG. 9.

FIGS. 18A to 18C are evaluation tables for possibilities of occurrence of three types of printing failure of "fade due to difficulty of ejection of ink droplets", "unevenness due to density differences caused by changes of the ink concentration", and "streak due to density differences caused by landing position deviations of ink droplets" against ink colors of used nozzles and time differences from the last ejections. The three types of printing failure may be caused by evaporation of moisture in ink. In the evaluation point tables, ejection time differences are substituted for the evaporation characteristics. Like the first embodiment, in a case where ink of one color is used for monotonous printing, an evaluation point for each ink color is set. In a case where inks of two or more colors are used for secondary or higher color printing, evaluation points may be set with respect to an ink with the longest ejection time difference. It should be noted that in a case where inks of two or more colors, a group of a plurality of evaluation points are set, but an evaluation point may be set for each pair of inks. It is predictable that the evaporation characteristic may exhibit more advanced evaporation with a longer ejection time difference than that with a shorter ejection time difference. For K, C, M inks, the failure evaluation points for "fade due to difficulty of ejection of ink droplets", "unevenness due to density differences caused by changes of the ink concentration", and "streak due to density differences caused by landing position deviations of ink droplets" are set higher as the ejection time difference increases. This is because the decreasing order of brightness of inks used in this embodiment is Y, M, C, and K and a printing failure may be conspicuous with ink having a lower brightness.

As described above, failure evaluation is performed by using tables in consideration of not only the temperature of a printing head but also evaporation characteristics corresponding to viscosity of ink before ejected from a printing element as information including a state of the ink to be ejected from the printing head. Thus, the accuracy of inspection item setting may be increased and the accuracy of evaluation for each nozzle may be increased, compared with a case where an inspection item is set only based on a temperature characteristic of an ink to be used.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiments of the present invention, and by a method performed by the computer of the system or apparatus by, for example, reading out and executing the computer executable instructions from the storage medium to perform the functions of one or more of the above-described embodiments. The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-150368, filed Jul. 19, 2013, which is hereby incorporated by reference herein in its entirety.

What is claimed is:

1. An image processing apparatus comprising:
a printing unit configured to print an image in a region on a printing medium based on input image data by using a printing head having an array of nozzles for ejecting ink;
an obtaining unit configured to obtain information regarding a state of ink ejected from the printing head to the region at a timing when the image based on the input image data is printed by the printing unit;
a determination unit configured to determine an inspection item on which a read image is obtained by reading the image printed by the printing unit based on the input image data by a reading unit to be inspected from a plurality of inspection items based on the information obtained by the obtaining unit wherein a kind of the determined inspection item varies according to the state indicated by the obtained information; and
an inspection unit configured to inspect the read image by performing, on image data of the read image, image processing corresponding to the inspection item determined by the determination unit.

2. The image processing apparatus according to claim 1, wherein the information includes a temperature of the printing head.

3. The image processing apparatus according to claim 2, wherein the obtaining unit obtains information including a temperature of the printing head with respect to a plurality of locations in a direction where nozzles are provided in the printing head.

4. The image processing apparatus according to claim 3, wherein the obtaining unit obtains information including a temperature of the printing head with respect to a plurality of locations in a direction intersecting with a direction where the nozzles are provided for printing the region in the printing head.

5. The image processing apparatus according to claim 2, wherein the information including a temperature of the printing head includes a temperature at a time when the region is printed.

6. The image processing apparatus according to claim 1, wherein the information includes a viscosity of ink to be ejected from the printing head.

7. The image processing apparatus according to claim 6, wherein information including a viscosity of an ink to be ejected from the printing head is an elapsed time since the corresponding nozzle last ejected ink droplets.

8. The image processing apparatus according to claim 1, wherein the printing head ejects ink of a plurality of colors, and the obtaining unit obtains information regarding each ink color.

9. The image processing apparatus according to claim 8 further comprising:
a second obtaining unit configured to obtain number-of-dots information including a number of ink dots ejected from the printing head for printing the image, of each ink color based on the input image data,
wherein the determination unit determines an inspection item based on the number-of-dots information obtained by the second obtaining unit.

10. The image processing apparatus according to claim 9, wherein the determination unit determines the inspection item based on the information corresponding to an ink color, the ink color being included in the number-of-dots information obtained by the second obtaining unit such that the number of dots is equal to or higher than a predetermined threshold value.

11. The image processing apparatus according to claim 8, wherein the input image data is binary data or multi-valued data corresponding to inks of the plurality of colors.

12. The image processing apparatus according to claim 1, wherein the inspection item determined by the determining unit includes at least one of density difference unevenness due to a change of an amount of ink in an ink droplet, a fade due to difficulty of ejection of ink droplets, unevenness due to density differences due to a change of an ink concentration, and density difference streak due to landing position deviation of ink droplets.

13. The image processing apparatus according to claim 1, wherein the inspection unit has the reading unit configured to read the image printed by the printing unit.

14. The image processing apparatus according to claim 13, wherein the inspection unit inspects the image based on a result of the reading by the reading unit and input image data.

15. The image processing apparatus according to claim 14, wherein the inspection unit inspects the image based on an inspection region having a size based on an inspection item determined by the determining unit.

16. The image processing apparatus according to claim 15, wherein the plurality of inspection items have inspection regions having at least one length different from each other.

17. The image processing apparatus according to claim 14, wherein the inspection unit converts data read by the reading unit and the input image data to data in a standard color space and compares color differences of the converted data for inspection.

18. The image processing apparatus according to claim 1, wherein the determination unit determines the inspection item further based on required times predetermined for each of the plurality of inspection items such that an inspection time by the inspection unit is within a predetermined permitted inspection time.

19. An image processing method comprising:
printing an image in a region on a printing medium based on input image data by using a printing head having nozzles configured to eject printing ink;
obtaining information including states of ink to be ejected from the printing head to the region for printing the image at a timing when the image based on the input image data is printed by the printing unit;
determining an inspection item on which a read image obtained by reading the image printed by the printing unit based on the input image data by a reading unit is to be inspected from a plurality of inspection items based on the obtained information wherein a kind of the determined inspection item varies according to the state indicated by the obtained information; and
inspecting the read image by performing, on image data of the read image, image processing corresponding to the determined inspection item.

20. The image processing method according to claim 19, wherein the inspection item is further determined based on required times predetermined for each of the plurality of inspection items such that an inspection time is within a predetermined permitted inspection time.

\* \* \* \* \*